United States Patent [19]

Farris

[11] 4,419,828

[45] Dec. 13, 1983

[54] APPARATUS FOR ESTABLISHING THE JUNCTION CONTOUR FOR INTERSECTING PIPES

[76] Inventor: David L. Farris, Rte. 1, Box 43D, Leesburg, Tex. 75451

[21] Appl. No.: 265,176

[22] Filed: May 19, 1981

[51] Int. Cl.³ .............................................. G01B 5/20
[52] U.S. Cl. .................................. 33/175; 33/21 C; 33/174 N; 33/192
[58] Field of Search .................... 33/192, 175, 174 N, 33/21 C

[56] References Cited

U.S. PATENT DOCUMENTS

| | | | |
|---|---|---|---|
| 776,713 | 12/1904 | Wurts | 33/175 |
| 791,235 | 5/1905 | Allen | 33/192 |
| 819,495 | 5/1906 | Allen | 33/192 |
| 927,110 | 7/1909 | Campbell | 33/192 |
| 2,380,919 | 8/1945 | Bugenhagen | 33/175 |
| 2,615,255 | 10/1952 | Rankin | 33/175 |
| 2,671,273 | 3/1954 | Barnes | 33/175 |
| 3,082,537 | 3/1963 | Solomon | 33/174 N |

Primary Examiner—William D. Martin, Jr.

Attorney, Agent, or Firm—Peter J. Murphy

[57] ABSTRACT

A simulator in the form of a tubular pantograph mechanism is adjustable in diameter, and has circumferentially spaced elongated rods mounted on the inner wall in parallel relation with the axis. These rods define the inner diameter of the simulator and when the simultor is compressed on a lateral, define the outer diameter of the lateral. These rods are movable axially with frictional restraint. A guide includes a base to be placed on the surface of the main in alignment with the axis of the main, and a linear guide arm pivotally mounted on the base in a manner to be clamped in a selected position aligned with the projected axis of the lateral to be joined to the main. The simulator includes coacting support brackets to mount the simulator on the guide arm; and the simulator rods are then moved axially into engagement with the surface of the main. The points of engagement of the rod ends define the contour of the joint opening to be cut in the main. When the simulator is again placed over the lateral, the points at the ends of the rods define the mating contour for the end of the lateral to be joined to the main.

4 Claims, 11 Drawing Figures

APPARATUS FOR ESTABLISHING THE JUNCTION CONTOUR FOR INTERSECTING PIPES

This invention relates to the joining of a pipe lateral to a linear pipe main; and more particularly to ascertaining the mating junction contours where a pipe lateral is to be joined to a pipe main usually of larger diameter.

When a lateral is to be joined to a main in the field, it is desirable to be able to ascertain quite accurately the contour of the opening for the joint which must be formed in a main, and the contour of the mating joint end face of the lateral. The accuracy of these contours is important particularly for the joining of steel pipe where the joint is to be a welded joint; and these accurate contours must be ascertained regardless of the angle of intersection and regardless of whether or not the axes of the two pipes are actually intersecting or are offset.

An object of this invention is to provide a novel apparatus for ascertaining the junction contour of a main and lateral to be joined.

Another object of this invention is to provide such novel apparatus which may be employed in the field where the intersecting angle of the pipes and possible offset cannot be precalculated.

A further object of this invention is to provide such novel apparatus to enable the immediate marking of the junction contours of the two pipes, and to enable the immediate cutting and joining of the two pipes.

Still another object of this invention is to provide such novel apparatus which is effective and accurate regardless of the angle of intersection of the pipes and regardless of any offset of the pipe axes.

These objects are accomplished in apparatus which includes broadly an adjustable simulator having circumferentially spaced, axially-slidable rods for defining the outer diameter of the lateral; wherein the rods are movable into engagement with the surface of the main to establish the contour. More particularly, the simulator comprises an endless pantograph mechanism formed to a tubular configuration, with the rods being mounted on the inner wall to define the inner diameter thereof. Still more particularly, the apparatus includes, in combination, means for guiding the simulator adjacent to the main with its longitudinal axis along the projected axis of the lateral.

The novel features and the advantages of the invention, as well as additional objects thereof, will be understood more fully from the following description when read in connection with the accompanying drawings.

DRAWINGS

FIGS. 1 through 3 of the drawing illustrate a pipe joint of the type to which the invention is directed;

DESCRIPTION OF THE PREFERRED EMBODIMENT

While the invention may be utilized for the joining of two pipes of the same size, and may be utilized for the joining of pipes having a cross-section other than circular, the invention is illustrated and described by way of example with respect to the joining of a smaller diameter cylindrical lateral to a larger diameter cylindrical main. The designation "main" and "lateral" are used only as descriptive examples of two pipes to be joined.

Figure 1:
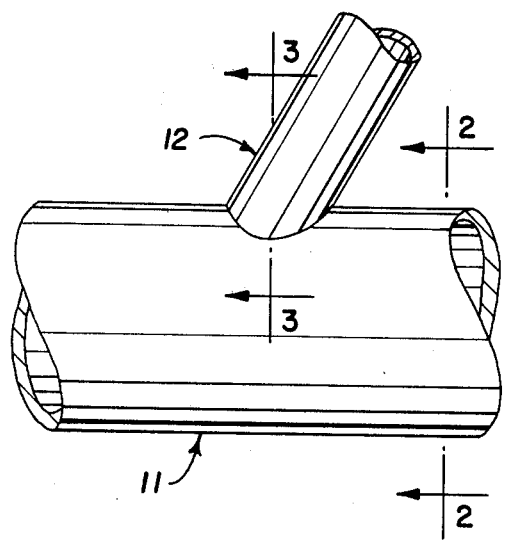
Figure 2:
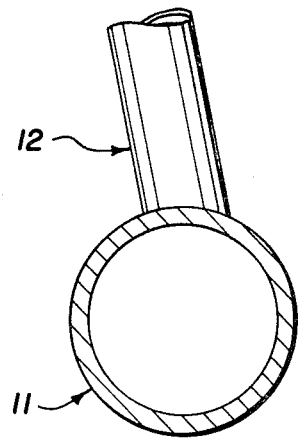
Figure 3:
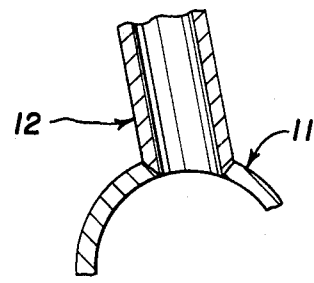
Figure 6:
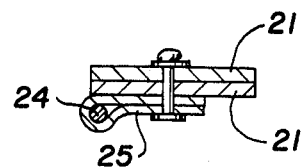
FIG. 6 is a sectional view taken along the line 6—6 of FIG. 5.
Figure 4:
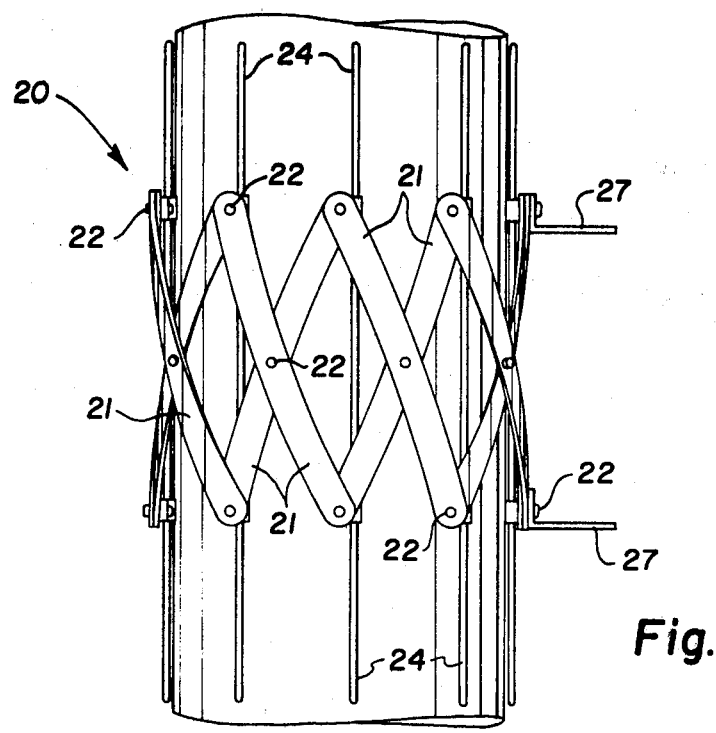
FIG. 4 is a side view of a pantograph mechanism simulator according to the invention.
Figure 5:
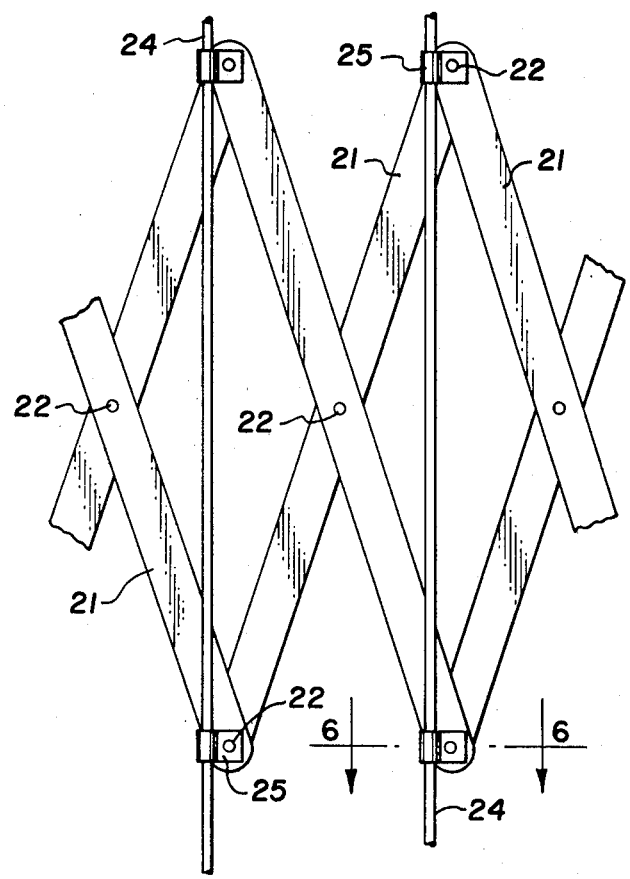
FIG. 5 is a fragmentary view of the interior wall of the simulator of FIG. 4.
Figure 9:
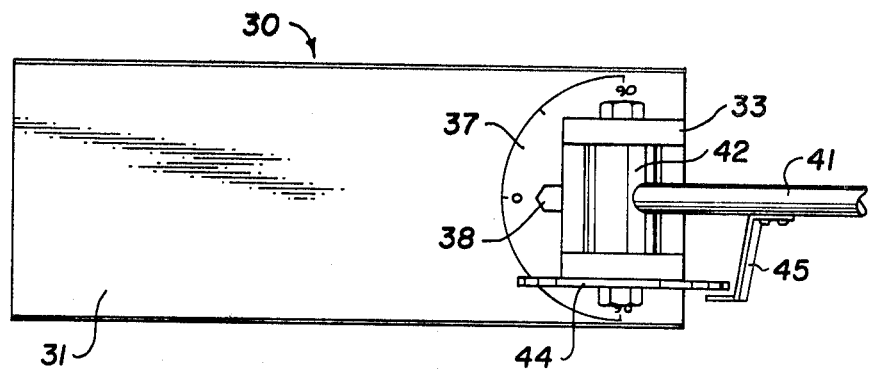
FIG. 9 is a top view of the guide of FIG. 7.
Figure 7:
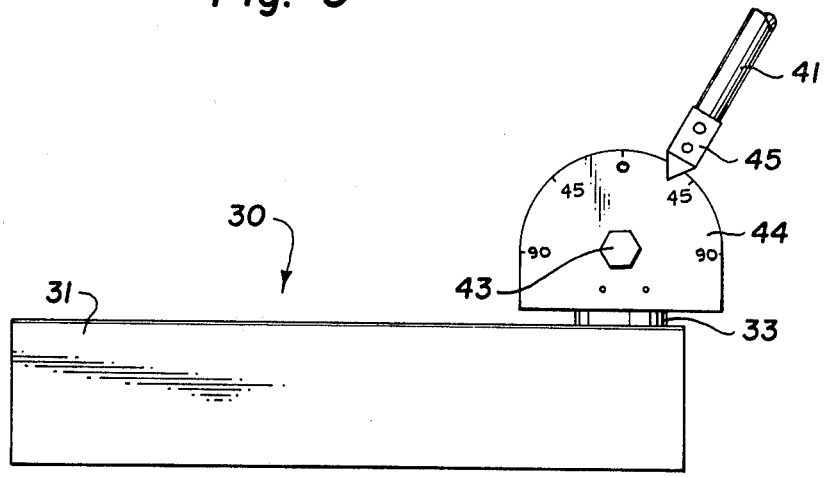
FIG. 7 is a side view of a guide according to the invention.
Figure 8:
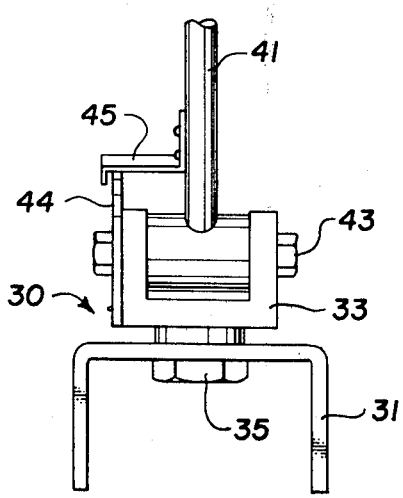
FIG. 8 is an end view of the guide of FIG. 7.

FIGS. 1 to 3 of the drawing illustrate a pipe joint of the type to which the invention is directed, wherein a lateral 12 is joined to a main 11, wherein the lateral intersects the main at an acute angle, and where the axes of the lateral and main do not intersect but, rather, are offset.

The apparatus of the invention consists of two basic components which are referred to as a simulator 20 and a guide 30. The simulator is so named because it functions to simulate the outer diameter of the pipe lateral and also the junction contour at the end of the pipe lateral which is to be joined to the body of the main 11. The guide 30 is an apparatus to be oriented with the axis of the main, and which functions to guide the positioning of the simulator 20 in relation to the main for the simulating of the intersection of the lateral with the main.

As seen in the drawings, the simulator 20 consists of an adjustable pantograph mechanism which consists of a plurality of links 21, which are elongated flat strips of a suitable material, which links are of uniform length and are joined together in a parallelogram arrangement. In this parallelogram arrangement, the links 21 are connected together at their respective ends and also at the midpoints between the respective ends. This mechanism is an endless pantograph mechanism, formed into a cylindrical configuration; and the mechanism therefore forms a tubular member which is adjustable to different diameters.

A plurality of elongated rods 24 are mounted on the inner wall of the simulator 20 by means of brackets 25; and the rods are supported on the simulator wall to be disposed parallel to the central axis of the tubular simulator and in uniform circumferentially spaced relation around the simulator. The rod brackets are so configured that when the simulator is compressed on a pipe section corresponding in size to a pipe lateral 12, the inner faces of the rods will essentially engage the pipe surface and will therefore define a diameter which corresponds to the outer diameter of the lateral 12. The pivot joints 22 of the simulator provide sufficient friction that the simulator will retain a diameter to which it is adjusted; after removal from the pipe section.

Preferably the rod brackets 25 are pivotally attached to the simulator at each of the end pivots of the links 21; and the brackets themselves are rotatable relative to these pivots to allow the simulator to be compressed and expanded. Each of the rods 24 then is slidably supported in a pair of rod brackets 25 which are attached to axially aligned pivots 22. The rod brackets may be fabricated from a suitable material to allow the rods to be moved axially but with frictional restraint so that the rods will remain in a selected axial position relative to the pantograph mechanism.

In order to align and guide the simulator at a desired angle relative to a main 11, the simulator is provided with a pair of axially aligned mounting brackets 27. These brackets are mounted on a pair of axially aligned end pivots 22, on the exterior of the simulator, and extend laterally relative to the simulator axis. Each of the brackets is provided with a hole 28 adjacent to its distal end, which holes are aligned parallel to the simulator axis and configured to receive an elongated guide bar of a guide to be described.

The guide 30 includes a base 31 which is an elongated channel-shaped member, with the edges of this member defining parallel runners which may be engaged with the cylindrical surface of a pipe main to orient the guide with the pipe. The guide then has a longitudinal axis which, when so oriented with the main, is disposed parallel to the axis of the main. The guide 30 further includes a turret 33, mounted for rotation about an axis perpendicular to the longitudinal axis of the base (and the axis of the main 11), the turret consisting of a base wall and upright ears 34. The turret base is rotatably secured to the base 31 by means of a suitable bolt-nut assembly 35 which defines the pivot mounting for the turret. This pivot mounting is designed to be tightened in order to lock the turret in a selected rotative position relative to the base 31. The ears 34 are provided with aligned holes which define a pivot axis perpendicular to the pivot axis of the turret mount 35.

A guide arm 41 consists of an elongated shaft having a transverse tubular base 42, the base 42 having a transverse bore which is perpendicular to the longitudinal axis of the guide arm and defines a pivot axis for the guide arm. The tubular base is received within the ears of the turret; and the guide arm is pivotally mounted to the turret by means of a suitable nut-bolt assembly 43 which extends through the holes in the ears 34 and the bore of the tubular base 42. This pivot mounting assembly 43 may be tightened to clamp the tubular base the ears and lock the guide arm in a selected rotative position relative to the turret.

For certain applications of the apparatus of the invention, the guide 30 may be appropriately oriented with the main 11 and a linear marking then applied to the main to identify the position of the guide 30 relative to the circumference of the main, and the guide arm 41 is then aligned parallel with the axis of the lateral to be joined to the main. The pivot mounts 35 and 43 would then be tightened to lock the respective positions of the turret and the guide arm. The guide arm may then be used to guide the simulator, as will be described presently, to ascertain the contours of the hole to be formed within the main and contour to be cut on the end of the lateral.

For certain joint configurations, it may be possible to predetermine the angle of elevation of the lateral relative to the axis of the main, and the lateral angle of the lateral relative to a vertical plane coincident with the axis of the main 11; and where this is possible it may be desirable to preset these predetermined angles in a guide 30. For this purpose the top of the base 31 may be provided with an angle indicia 37 to indicate an angle of rotation of the turret 33 relative to the base; and the turret may be provided with a pointer 38 for coaction with the indicia 37. Similarly, the turret may be provided with an angular indicia 45 to indicate the angle of the guide arm 41 relative to a plane coincident with both the turret axis and the guide arm axis; and the guide arm may be provided with a pointer 46 coacting with the indicia 45. For use of the guide 30 with predetermined angles locked in, the guide 30 would preferably be oriented on the main with the turret axis disposed in a vertical plane passing through the axis of the main.

In use of the apparatus of the invention, for the orienting of the guide arm parallel to the axis of the lateral 12 and for the locking of the two pivot mounts, the guide is either held or secured to the main 11 in any suitable manner. The simulator, which has been compressed around a section of pipe to simulate the diameter of the lateral 12, is then placed on the guide 30 in the manner indicated in FIG. 10. The guide 30 and simulator 20 may then be moved along the main, without any circumferential movement of the guide, to position the axis of the simulator in alignment with the axis of the lateral. Each of the rods 24 is then moved axially to a point just touching the surface of the main; and the points where these rods touch identify the outline of the hole contour. These points may be marked with a suitable marker and, after removal of the simulator and guide from the main, a continous line may be drawn through these marked points which line will represent the contour of the hole to be cut in the main.

The simulator 20 is then placed over the section of pipe lateral which is to be actually joined to the main, (FIG. 11) after the desired length of that section has been ascertained, and the ends of the simulator rods 24 will identify the contour of the end cut of this pipe section. Again suitable marks may be placed on the pipe corresponding to the ends of the rods 24, and, after the simulator is removed, these marked points are connected by a continuous line to identify the contour of the cut to be made.

As an alternative procedure, after the simulator rods 24 have been positioned relative to the surface of the main 11 as described above, the simulator and guide are removed from the main without marking the main, but only marking the lateral as has been described. Then, after the lateral has been cut along the indicated contour, the lateral is fitted in place contiguous to the main, and the contour of the hole to be formed in the main is marked using the lateral itself as a guide or template for producing this contour.

Operation and Method

While the operation of the apparatus has been described to some extent, the entire operation will be clear from the following description of the method of the invention.

The method of the invention involves first the ascertaining of the axis of the lateral and the point where this axis will intersect the main. This lateral axis may be ascertained, in the field, when the last full section of the lateral is laid, by projecting the axis of that last section to the point of intersection with the main which point should be marked. Possibly a string might be connected between the main and last section of the lateral to identify this axis.

Desirably a line should be marked along the surface of the main, parallel to its axis, as a guide line for subsequent movement of the guide 30 along the main without accompanying circumferential movement. Next, the guide 30 is placed on the main, aligned with the main and in a selected relation to the above mentioned guide line; and the turret 33 and the guide arm 41 are appropriately adjusted to align the guide arm parallel to the projected axis of the lateral. The turret and guide arm are then clamped in the respective adjusted positions.

Next, the simulator 20 is placed over a section of pipe for the lateral 12 and is compressed to bring its rods 24 into engagement with the pipe surface whereby the rods define the outer diameter of the lateral. The simulator then slipped off the pipe section and joined to the guide 30 by slipping the mounting brackets 27 over the guide arm 41.

The guide 30 is then held in the same selected position relative to the above mentioned guide mark, and possibly moved longitudinally along the main 11 to position the axis of the simulator in coincident alignment with the projected lateral axis. The above mentioned string would be removed prior to this step.

Then holding the guide 30 and the simulator 20 in these positions, the rods 24 are moved axially to place the adjacent ends in engagement with the surface of the main 11. Since these rods 24 simulate the outer diameter of the lateral, the points where these rods engage the main define a contour on the main which is a projection of the outer surface of the lateral. These contact points may be marked on the main and, after removal of the guide and simulator, these marks may be connected with a continuous line to establish that contour. That contour, then, is the outer limit of a hole to be formed in the main 11 for the junction with the lateral.

Figure 10:
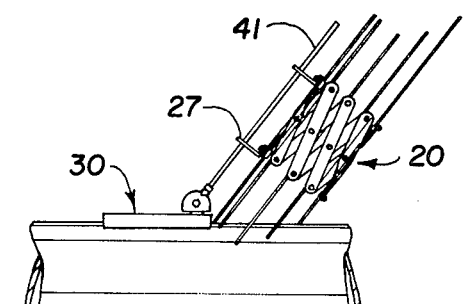
FIG. 10 is a perspective view of a guide and simulator is assembled relation, and in operative relation to a section of a main to establish the contour of the opening in the main.

FIG. 10 of the drawing illustrates, in part, the steps described in this paragraph.

Figure 11:
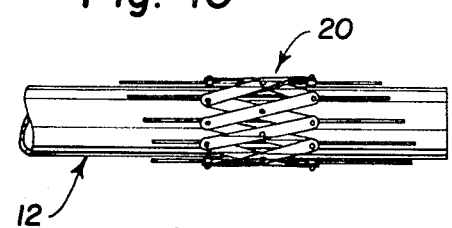
FIG. 11 is a side view of a simulator in operative relation to a section of a lateral to establish the end contour of the lateral.

Next, the simulator is separated from the guide and slipped over a section of pipe which is to form the last section of the lateral joined to the main. Depending on the type of pipe used, it may be necessary first to establish the length of this last pipe section. The simulator 20 is then used, as indicated in FIG. 11, to establish the contour of the end cut which contour is defined by the ends of the rods 24. These end points of the rods may be marked on the lateral and, after removal of the simulator, these points connected with a continuous line to establish the contour to be cut.

If the contour of the opening in the main 11 has not been established as described above, the cut end of the lateral may be placed in aligned relation with the main, and end of the lateral itself used as a template to establish the contour on the surface of the main.

Where the pipes to be joined are fabricated from steel, the cuts will likely be made with a cutting torch; and the surfaces of the cuts will likely be beveled, as illustrated in FIG. 3, so that the hole in the main 11 provides a seat for the lateral 12. With this seating relationship established, the completing of the joint by means of exterior weld bead is facilitated.

What has been described are a unique apparatus and a unique method for the joining of a lateral to a main in the field.

A particular feature and advantage of the apparatus and method of the invention is that they may be employed by the field personnel making such a joint to establish, with minimum expenditure of time and with considerable precision, the contours of the opening in the main and the mating end cut for the lateral, to accomplish a successful completion of the joint.

A related feature and advantage of the invention is that the joint contours are accurate regardless of the angle of intersection of the pipes and regardless of whether or not the axes of the pipes are intersecting or are offset.

While the preferred embodiments of the invention have been illustrated and described, it will be understood by those skilled in the art that changes and modifications may be resorted to without departing from the spirit and scope of the invention.

What is claimed is:

1. Apparatus for establishing, for a main and a lateral to be joined in intersecting relation, the contour of a mating junction; said apparatus comprising an adjustable simulator having circumferentially spaced, axially-slidable rods for defining the outer diameter of said lateral; said simulator comprising an endless pantograph mechanism formed to a tubular configuration;

said rods being disposed on the inner wall of said pantograph mechanism to be placed, pursuant to adjustment of said mechanism, in contiguous relation with the surface of an encircled lateral to define said outer diameter of said lateral;

said pantograph mechanism having circumferentially spaced pairs of axially aligned pivot joints; pivoted bracket means mounted at each of said pivot joints; one of said rods being mounted in each pair of brackets corresponding to each of said circumferentially spaced pairs of pivot joints, whereby said pantograph mechanism supports said rods in circumferentially spaced parallel relation to its longitudinal axis; said rods defining the inner cylindrical surface of said simulator;

means for guiding said simulator adjacent to said main with its longitudinal axis aligned along the projected axis of said lateral;

and said rods being movable into engagement with the surface of said main to establish said contour.

2. Apparatus for establishing, for a main and a lateral to be joined in intersecting relation, the contour of a mating junction; said apparatus comprising an adjustable simulator having circumferentially spaced, axially-slidable rods for defining the outer diameter of said lateral; said simulator comprising an endless pantograph mechanism formed to a tubular configuration;

means for guiding said simulator adjacent to said main with its longitudinal axis aligned along the projected axis of said lateral; said means including a pair of axially spaced brackets mounted on the exterior of said pantograph mechanism; said brackets having means defining a mounting axis aligned parallel to the longitudinal axis of said simulator;

and said rods being movable into engagement with the surface of said main to establish said contour.

3. Apparatus as set forth in claim 1 a pair of axially spaced brackets mounted on the exterior of said pantograph mechanism; said brackets having means defining a mounting axis aligned parallel to the longitudinal axis of said pantograph mechanism;

said brackets being pivotally mounted on one of said pairs of said pantograph mechanism pivots.

4. Apparatus for establishing, for a main and a lateral to be joined in intersecting relation, the contour of a mating junction; said apparatus comprising an adjustable simulator including a radially adjustable tubular body and a plurality of circumferentially spaced, axially parallel rods mounted on said body to define the inner diameter of said tubular body and the outer diameter of said lateral;

said simulator comprising an endless pantograph mechanism formed to have a tubular configuration;

said rods being disposed on the inner wall of said pantograph mechanism to be placed, pursuant to adjustment of said mechanism, in contiguous relation with the surface of an encircled lateral to define said outer diameter of said lateral;

said pantograph mechanism having circumferentially spaced pairs of axially aligned pivot joints; pivoted bracket means mounted at each of said pivot joints; one of said rods being mounted in each pair of brackets corresponding to each of said circumferentially spaced pairs of pivot joints, whereby said pantograph mechanism supports said rods in circumferentially spaced parallel relation to its longitudinal axis; said rods defining the inner cylindrical surface of said simulator;

and said rods being movable axially relative to said tubular body into engagement with the surface of said main, when said simulator is positioned adjacent to said means and aligned along a projected axis of said lateral, to establish the junction contour for said main and said lateral.

* * * * *